May 30, 1933.          R. B. FUNK          1,912,270
INSULATING MEANS
Filed Oct. 7, 1932
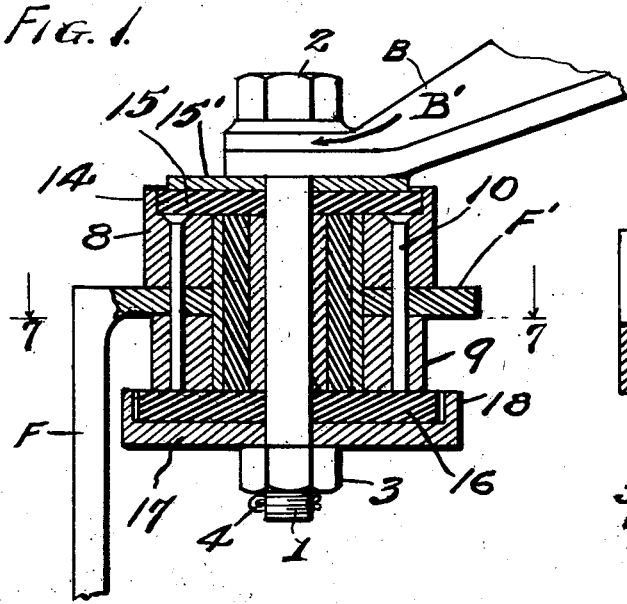
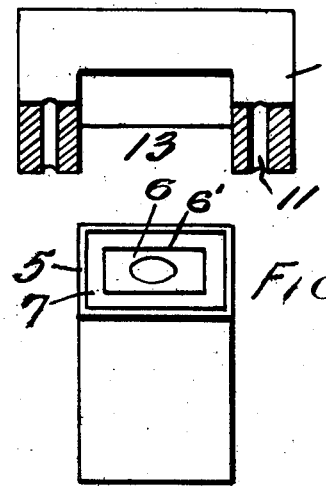
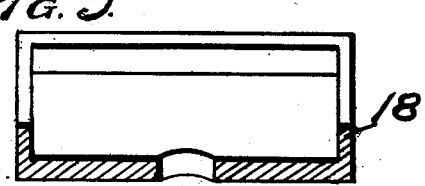
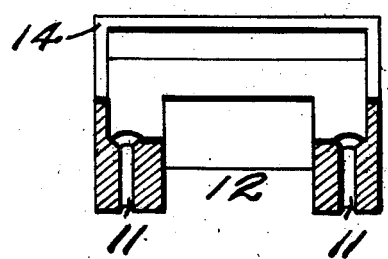
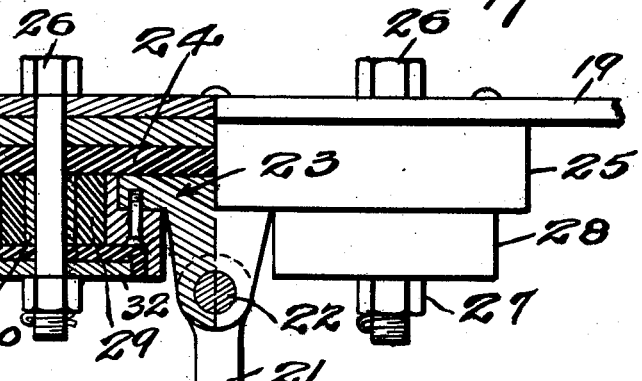
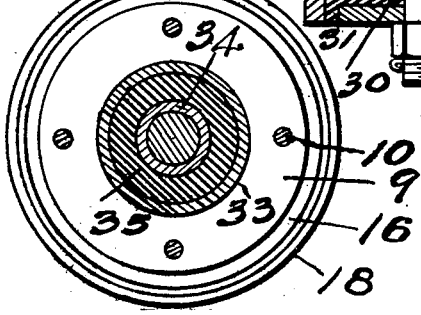
Inventor
RUFUS B. FUNK
By Chas. K. Davis
Attorney Patented May 30, 1933

1,912,270

UNITED STATES PATENT OFFICE

RUFUS B. FUNK, OF WASHINGTON, DISTRICT OF COLUMBIA

INSULATING MEANS

Application filed October 7, 1932. Serial No. 636,728.

My present invention relates to an improved insulating means to prevent transmission of sounds and vibrations between joined or jointed parts of automotive vehicles, and, while the insulating means of my invention is applicable for various uses, I have herein illustrated a joint for an engine mounting and a joint for a spring or similar mounting, both of which involve the principles of my invention, and exemplify its physical embodiment.

As is well known, the bodies, frames, and operating parts and units of automotive vehicles, which are composed of materials that are good conductors of vibrations and sounds, transmit these sounds and vibrations through non-insulated joints, from one part to another part, without interruption. The transmission of these vibrations and sounds results in trembling of the frame and body and frequently into dislocation of parts or units, as well as in humming noises and roars, to the discomfort as well as danger at times to the riders in the vehicle.

It is one object of my invention to eliminate the transmission of these vibrations, strains and stresses, as well as sounds, from one part to another, by completely insulating the joints between metal parts and other materials that are good conductors of sounds and vibrations through the use at the joints of interposed insulators of non-conducting materials.

The insulating material may be resilient, as when rubber or rubber compositions are employed, or leather, felt, and similar materials may be employed at the joints, for absorbing the vibrations and sounds originating in one part of the structure, and preventing such vibrations and sounds from passing to another part of the structure.

Various attempts have been made to eliminate, or insulate against the transmission of these sounds and vibrations, in the engine-mountings, spring-mountings, body-to-frame joints, and in other fastening means or devices, which, however, I find do not meet the requirements of durability, safety, strength, stability, and the ability to completely absorb the strains and stresses constantly occurring in various parts of the vehicle.

By the utilization of the principles of my invention I am enabled to eliminate metal-to-metal contact and the consequent transmission of sound that would occur from this contact, and also to insulate joints, mounts, and fastenings in the vehicle against transmission of strains, stresses and vibrations. Particularly I provide adequate and ample insulation, between jointed or joined metal parts, against the transmission of horizontal or lateral strains and stresses, as for instance, against those strains imposed in overcoming inertia when the vehicle is started, and against strains and stresses created in suddenly checking the momentum or impetus of the forwardly moving vehicle when the brakes are applied. The insulating of the joints according to my invention is also effective in preventing dislocation of parts or units, as for instance when the brakes of the vehicle are applied to prevent a collision, or in case of an actual head-on collision. In either of such events, the motor or engine particularly, as well as other parts imposes strains and stresses on its mounting, which, if not properly absorbed, will result in dislocation of the motor or engine.

In accomplishing these objects I provide stable and firm, insulated joints, which joints have a wide area for equal and uniform distribution, as well as for the absorption of the shocks, strains, stresses, and vibrations that may be encountered.

The invention consists in certain novel combinations and arrangements of parts as will hereinafter be more fully set forth and claimed. In the accompanying drawing I have illustrated two examples of the physical embodiment of my invention, wherein the parts are combined and arranged to exemplify the invention, but it will be understood that changes and alterations may be made in the exemplified structures, within the scope of my claims, without departing from the principles of my invention.

Figure 1 is a sectional view showing the principles of my invention embodied in an engine mounting.

Figure 2 is a detail perspective view in section showing the upper block of the joint in Figure 1, and Figure 3 is a smilar view of the lower block.

Figure 4 is an isometric view of the insulating core of the joint, through which the bolt passes.

Figure 5 is a detail perspective view in section showing the lower washer-plate of the joint. Figure 6 is a view partially in section showing a joint used in a spring mounting and constructed according to my invention. Figure 7 is a plan view partly in section showing, as at line 7—7 of Figure 1, a modified form of the invention.

In order that the general assembly and arrangement of parts may readily be understood I have shown in Figure 1 a portion B of a bracket arm of an engine mounting, which represents the supported member of the joint, and F represents the supporting member, which may be the frame of an automotive vehicle with its top flange F', or the supporting member F may be an angle bracket or step that is secured at the side of the side rail or frame of the automotive vehicle chassis.

The supporting member and the supported member are joined by use of the bolt 1 which passes through the bracket arm B and is provided with a head 2, and a lower nut 3 which latter may be secured against loss by the cotter pin 4 passed through a transverse opening in the threaded part of the bolt.

The bolt passes through an insulating core of generally rectangular shape in cross section, and fashioned of metal and insulating material, to fit in an opening in the flange F' of the supporting member of the joint. The core comprises an outer, metal shell 5, preferably of rectangular shape which may be in the form of an oblong and fitting in an opening in the flange F', with the longer axis of the oblong transverse to the longitudinal axis of the automotive vehicle, but I of course do not limit myself to this specific arrangement of parts. It is essential, however, that the shell, when used in an engine mounting for instance, with its side walls at the four points of the compass, shall present comparatively high and wide surfaces at the front and rear, for the reason that the greatest strains and stresses on the engine mounting occur in the starting and stopping of an automobile, that is, the greatest horizontal strains are disposed longitudinally of the vehicle.

Within the shell is located a central, cast bushing 6 also of metal, having a cylindrical bore to accommodate the bolt, and having an exterior periphery of rectangular or oblong shape in cross section to conform to the inner periphery of the rectangular shell. Between the shell and the bushing the insulating material 7 is interposed, which may be in sheets, but the material as rubber, is preferably moulded between the inner and outer members, and the core presents the unitary shape as indicated in Figure 4.

The insulating core, as shown, and the bolt, are both of considerable length, in order that the insulating core may have, on the inner faces of the shell, a maximum area against which insulating mat or pad 7 impinges as shocks and strains are absorbed. To prevent any wobbling movement of the bolt and insulating core, I provide stabilizing blocks 8 and 9, of metal, above and below the supporting member of flange F'. The stabilizing blocks which reinforce the flange F' provide a firm anchorage for the bolt and a container for the insulating core, and allow for use of the desired length of the insulating core. The blocks also provide compression faces for the two outer insulating pads on the bolt. These blocks which are of considerable thickness, as indicated in Figure 1, during assembly, and after assembly, are retained in place by means of pins 10 that are passed through holes 11 in the blocks and in the supporting member F' and both blocks are fashioned with rectangular, central openings as 12 in the upper block 8, and 13 in the lower block 9. The walls of the two openings 12 and 13 coincide with the walls of the opening in the flange F' and the shell of the insulating core fits tightly in combined opening furnished by the flange and the upper and lower stabilizing blocks.

The upper face of the upper block 8 is fashioned with a flange 14, and an insulating pad or mat 15 is seated in the flanged face between said face and a metal washer-plate 15', which plate is retained beneath the perforated head B' of the bracket B.

A second insulating pad or mat 16 is located beneath the insulating core and block 9, and a washer-plate 17 having a flange 18 is retained by the nut 3.

In this manner the supporting member F and the supported member B are insulated against transmission of sound as well as vibrations, strains and stresses between them and the insulating core, blocks and pads or mats are firmly clamped together by the bolt, head B' and the nut 3, as desired.

The mats or pads 15' and 16 and their washers or plates 15' and 17, it will be noted, furnish broad bearing and cushioning or insulating members between the bolt, head and nut and the ends of the insulating core and the outer faces of the two stabilizing blocks, and the latter also furnish broad bearing faces for the pads 8 and 9, whereby the shell of the insulating core is held rigidly in the metallic blocks against lateral movement.

Now assuming that an automobile equipped with the engine mount illustrated in Figure 1 is stopped suddenly, the momentum or impetus of the automobile, when in motion, is transmitted in a forward longitudinal strain through the bolt to the bushing 6 of the core, and the front, broad, flat face 6' of the bushing indicated in Figure 4, impinges against the insulating pad, pressing the pad against the broad flat front wall of the shell 5. Inasmuch as the shell is enclosed within an unyielding metal structure comprising the flange F' and the blocks 8 and 9, it will be apparent that the longitudinal strain or stress thus imposed will be absorbed by the insulating mat or pad 7 between the bushing and the shell.

Because of the long and wide area of the bearing face 6' of the bush and the complementary long and wide areas of the insulating mat or pad and the front wall of the shell, the strain is thus widely distributed, uniformly, over an area of ample size to completely absorb the strain and thus prevent dislocation of any of the parts of the structure.

The same effects and result are attained in the structure of Figure 6 where a portion of a frame (or bracket) is shown at 19 and provided with a reinforcing plate 20. The spring shackle indicated at 21 is pivotally suspended at 22 from the horizontal shackle plate 23, and an insulating pad 24 is interposed within the flange 25 between plates 20 and 23.

Clamp bolts 26 with their nuts 27, clamp the parts together and an insulating core is employed with each bolt. Each of these cores comprises a combined shell and block as 28, that is secured by screws to the shackle-plate, an insulating pad 29, and the metal bushing 30 through which the bolt 26 is passed. A lower insulating pad or mat 31 is retained between the washer-plate 32 at its lower side and the insulating core and shell-block at its upper side.

In Figure 7 I illustrate a modification of the invention in which the insulating core has a cylindrical shell 33 and bushing 34 between which is located the insulating pad 35, and the block 9, pad 16 and flange 18 on the plate 17 are shown as circular.

Having thus fully described my invention, what I claim as new and desire to secure by Letters Patent is:—

1. In an insulated connection between a supported member and a supporting member, the combination with an insulating core extending transversely through one of said members and a bolt in said core, of a pair of stabilizing blocks located above and below said last mentioned member at the ends of said core, one of said blocks having a flanged face and an insulating pad seated in said face, an insulating pad fitted against the outer face of the other block, and a flanged washer-plate at the outer face of the last mentioned pad.

2. In an insulated connection between a supporting member and a supported member, the combination of an insulating core supported in one of said members and comprising an outer shell rectangular in cross section, an inner bolt-bushing having an exterior rectangular periphery complementary to the shell and an insulating pad between the shell and bushing, a pair of stabilizing blocks located above and below the supporting member and surrounding said core, a bolt passed through the bushing, clamping means at opposite ends of the bolt, insulating pads abutting the end-faces of the core and the outer faces of the blocks, and said insulating pads retained in position by the clamping means.

3. In a clamped insulating joint between a supporting member and a supported member, the combination with a headed bolt extending through said members, of an insulating core surrounding a major portion of the length of the bolt and comprising a metallic shell located in one of said members, a bushing on said bolt having an exterior periphery complementary to said shell, and an insulating pad between the shell and bushing; an insulating pad abutting one end face of the core and located between said members, an insulating pad abutting the other face of the core and contacting with one of said members, metallic elements in contact with the outer faces of the two last mentioned pads and a clamp nut on the bolt whereby the two end pads are compressed and the two members clamped in substantially rigid positions.

In testimony whereof I affix my signature.

RUFUS B. FUNK.